United States Patent
Zaki et al.

(10) Patent No.: US 8,768,647 B1
(45) Date of Patent: Jul. 1, 2014

(54) HIGH ACCURACY HEADING SENSOR FOR AN UNDERWATER TOWED ARRAY

(75) Inventors: Ahmed S. Zaki, Kingston, RI (US); Timothy B. Straw, Narragansett, RI (US); Michael J. Obara, North Kingston, RI (US); Peter A. Child, East Providence, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 391 days.

(21) Appl. No.: 13/238,425

(22) Filed: Sep. 21, 2011

(51) Int. Cl.
*G01C 21/16* (2006.01)

(52) U.S. Cl.
USPC .......................................................... 702/150

(58) Field of Classification Search
CPC ....................................................... G01C 21/16
USPC .......................................................... 702/150
See application file for complete search history.

(56) References Cited

U.S. PATENT DOCUMENTS 5,645,077 A * 7/1997 Foxlin ........................... 600/587

* cited by examiner

*Primary Examiner* — Stephen Cherry
(74) *Attorney, Agent, or Firm* — James M. Kasischke; Jean-Paul A. Nasser; Michael P. Stanley

(57) ABSTRACT

A high performance solid-state heading sensor for underwater towed arrays is taught that combines high quality MEMS sensor components with data processing filters to resolve performance limitations present in prior art heading sensors. The heading sensor employs rate gyroscopes, accelerometers, magnetometers and a customized Kalman filter formulation implemented on a micro-controller to improve performance in determining the roll, pitch and heading of a towed array.

4 Claims, 3 Drawing Sheets

HIGH ACCURACY HEADING SENSOR FOR AN UNDERWATER TOWED ARRAY

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to heading sensors for underwater towed arrays, and in particular to a high performance solid state heading sensor operated in conjunction with a data processing orientation formulation for towed acoustic arrays.

(2) Description of the Prior Art

Current towed acoustic sonar arrays use magnetic heading sensors to measure the shape of the array to determine the azimuthal bearing of acoustic sources of interest and to allow for the determination of array shape for improved beamforming performance. The towed array application requires very high accuracy measurement of the horizontal angle between the axis of the array and the magnetic field vector, even at high earth latitudes where the horizontal component of the magnetic field vector may only be 10% of the total vector magnitude. Existing heading sensors use fluxgate floating ring-core gimbal magnetometers that suffer significantly from reliability and production problems. Due to the gimbal design of these sensors, the heading sensor output becomes very noisy and completely unreliable due to the flow induced vibration that excites the gimbal close to its resonance during vessel maneuvers and during erratic array motion.

For this reason, what is needed is a heading sensor that provides accurate heading measurements when the array is under dynamic motion within the constraints of power consumption, processing and space that are imposed by implementation into an underwater towed acoustic array.

SUMMARY OF THE INVENTION

It is a general purpose and object of the present invention to provide a heading sensor that provides accurate heading measurements when the array is under dynamic motion, for example during vessel turns and during times of vessel straight course when the array is exhibiting unstable motion.

This object is accomplished by employing a series of micro electro-mechanical systems (MEMS) sensors and other miniature sensors in a suite operated in conjunction with a customized Kalman filter formulation that can accurately relay heading, pitch and roll information for an underwater towed array.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
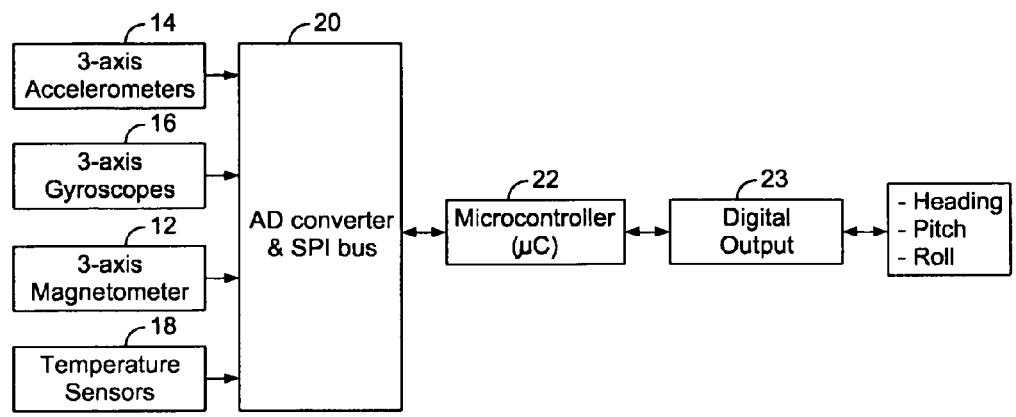
FIG. 1 is an illustration of the components of the heading sensor of the present invention.

Referring now to FIG. 1 there is illustrated a heading sensor 10 for a towed array comprised of a suite of micro electro-mechanical system (MEMS) sensors and other miniature sensors. The heading sensor 10 fuses the output of individual sensors including accelerometers, gyroscopes and magnetometers to determine sensor heading, pitch and roll angles relative to the Earth's gravity vector and the horizontal component of the Earth's magnetic field vector.

The suite of micro electro-mechanical systems sensors and other miniature sensors comprises three magnetometers 12 (magneto-resistive or magneto-inductive) with each magnetometer 12 assigned to one of the three (x, y, z) spatial axes, three accelerometers 14 with each accelerometer 14 assigned to one of the three (x, y, z) spatial axes, three solid state MEMS gyroscopes 16 with each gyroscope 16 assigned to one of the three (x, y, z) spatial axes and a temperature sensor 18 for use in calibration of the other sensors. The analog voltage output signals from the sensors are directed to an analog to digital converter and serial peripheral interface (SPI) bus 20 to digitize the signals for processing by a customized Kalman filter formulation implemented by a low power (thirty milliamps at five volts in the preferred embodiment due to constraints in receiving power from the towed array system) microcontroller 22, which converts the signals to heading, pitch and roll data. In a preferred embodiment, the microcontroller 22 has a non-volatile memory component, has a sensor sampling rate of 200 Hz, a processing rate of 40 Hz, and performs real-time single precision floating point processing. The microcontroller 22 implements the Kalman filter formulation and addresses temperature compensation for the sensors, in-situ field calibration and physical alignment, and sensor data integration. A communication interface 23 channels the digital output of the microcontroller 22 to the host sonar system.

The Kalman filter formulation makes the best use of all the data available from sensors and thereby achieves a lower mean squared orientation estimation error than prior art methods and apparatus. Due to the nonlinear nature of the attitude determination equations and the fact that the Kalman filter must be simple enough to run in real-time, the formulation suits a reduced order and yet efficient customized Kalman filter.

Figure 2:
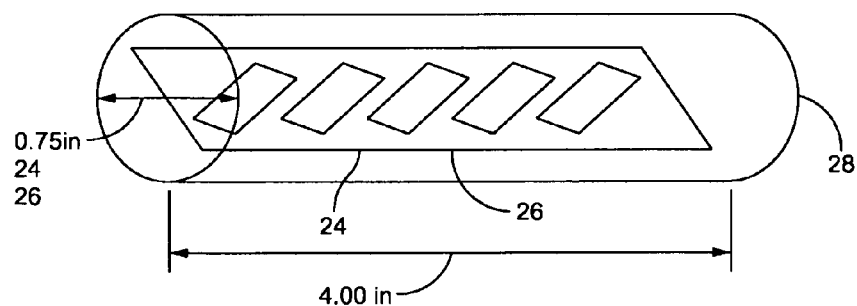
FIG. 2 is an illustration of the exemplary physical arrangements of the components of the heading sensor of the present invention.

In a preferred embodiment, as illustrated in FIG. 2, the individual components (accelerometers 14, magnetometers 12, gyroscopes 16, thermometer 18, micro-controller 22) of the heading sensor 10 are all mounted to a printed circuit board 24 with a stabilized backing 26. The entire heading sensor 10 is contained in a non-magnetic cylindrical container 28 that protects the components from hydrostatic pressure and the mechanical forces subjected by the towed array handling and stowage systems. In a preferred embodiment the physical dimensions of the heading sensor 10 allow it to fit in a 0.75 inch diameter cylinder that is 4 inches long allowing it to fit within the small diameter of acoustic arrays, typically 1.5 inches. In a preferred embodiment, the physical dimensions and low power consumption of the heading sensor 10 allow for multiple heading sensors 10 to be incorporated into a towed acoustic array in the case where more sensors are used to allow for the averaging of heading readings for improved accuracy.

During manufacturing, each of the components of the heading sensor 10, (accelerometers 14, magnetometers 12, gyroscopes 16), is calibrated with respect to temperature following a burn-in and aging process that helps to ensure that each of the components remain stable over time and variable temperature. The calibration coefficients, obtained during testing performed after the burn-in and aging process are stored in a look-up table residing in the non-volatile memory component of microcontroller 22 for use in processing the sensor data.

The customized Kalman filter formulation involves multiple data preparation and processing steps. The first step deals with accelerometer 14 data preparation. The accelerometer 14 analog-to-digital converter output is an uncalibrated digital number proportional to acceleration. Using the calibration table of the accelerometer versus temperature, the calibrated x-axis acceleration is calculated as follows:

$$a_x = \frac{AV_x - Abias_x}{scalefactor_x} \quad (1)$$

Where $AV_x$ is the accelerometer 14 voltage in the X direction, $Abias_x$ is the bias versus temperature table for Accelerometer) (which is a function of temperature, and $scalefactor_x$ is a multiplier that scales the analog-to-digital converter output from counts to measurement units of meters per second squared. Y and Z directions are treated similarly. A check to calculate the total acceleration is as follows:

$$Atotal = \sqrt{A_x^2 + A_y^2 + A_z^w} \quad (2)$$

such that Atotal is equal to 1.0 within a predetermined tolerance.

The second step involves gyroscope 16 data processing. The gyroscope 16 analog-to-digital converter output is an uncalibrated digital number proportional to rotational rate. Using the calibration table of the gyroscopes versus temperature, the rate of turn is calculated as follows:

$$\omega_x = \frac{GV_x - Gbias_x}{scalefactor_x} \quad (3)$$

$Gbias_x$ is the gyroscope bias in the X direction versus temperature and $scalefactor_x$ is a multiplier that scales the analog-to-digital converter output from counts to measurement units of radians per second. The rate of turn in the Y and Z directions are calculated similarly.

The third step involves magnetometer 12 data processing to measure azimuth. The magnetometer 12 data versus temperature data is calibrated if needed. The field measurements of the magnetometer are calculated as follows:

$$H_x = HV_x - Hbias_x \quad (4)$$

$H_x$ is the magnetic field in the X direction and $Hbias_x$ is the magnetometer bias in the X direction. The magnetic field in the Y and Z directions are calculated similarly. Magnetic field data is combined with the accelerometer data to obtain a heading measurement.

The fourth step involves Kalman filter processing. The Kalman filter process integrates the following attitude equation:

$$\begin{Bmatrix} \dot{\phi}(t) \\ \dot{\theta}(t) \\ \dot{\Psi}(t) \end{Bmatrix} = \begin{bmatrix} 1 & \sin\phi\tan\phi & \cos\phi\tan\theta \\ 0 & \cos\phi & -\sin\Psi \\ 0 & \sin\phi/\cos\theta & \cos\phi/\cos\theta \end{bmatrix} \begin{Bmatrix} \omega_x(t) \\ \omega_y(t) \\ \omega_z(t) \end{Bmatrix} \quad (5)$$

Euler angles use the conventions $\psi$, $\theta$, and æ, which are the heading, pitch and roll respectively, represent positive rotation about the z, y and x body axis in turn, with the positive x-axis point forward, positive y-axis pointing right and positive z-axis point down. The rates measured by the gyroscopes are represented as $\omega_x$, $\omega_y$, $\omega_z$. The processing integrates the three axis gyroscope continuously with time, and uses the accelerometer pitch and roll outputs and magnetometer heading outputs as long term correction references to bind the solution with the Kalman filter formulation. The pitch and roll developed from this process step is fed back into the formulation to estimate the heading using the previous equations.

Figure 3:
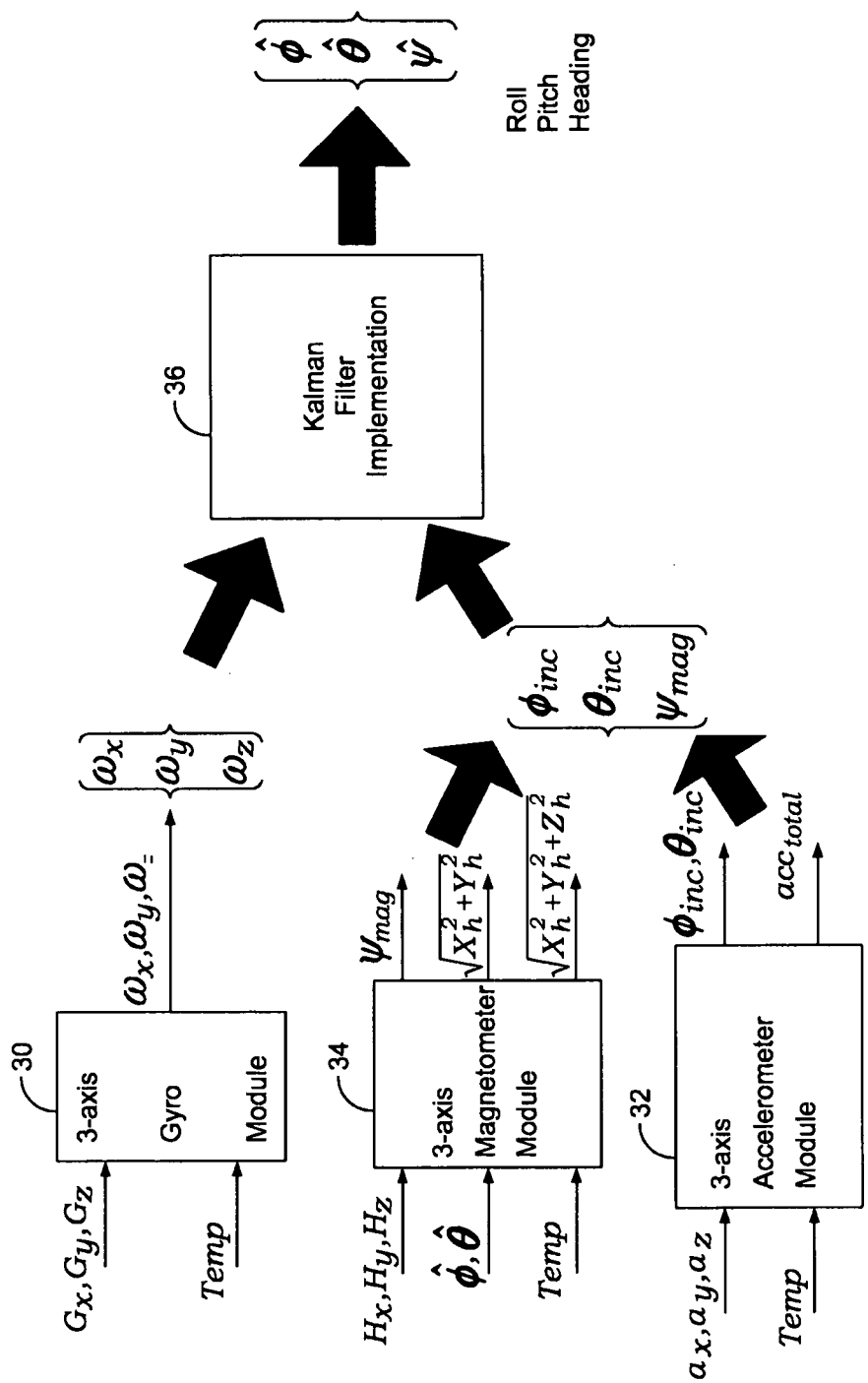
FIG. 3 is a software module and data flow diagram of the customized Kalman filter formulation.
Figure 4:
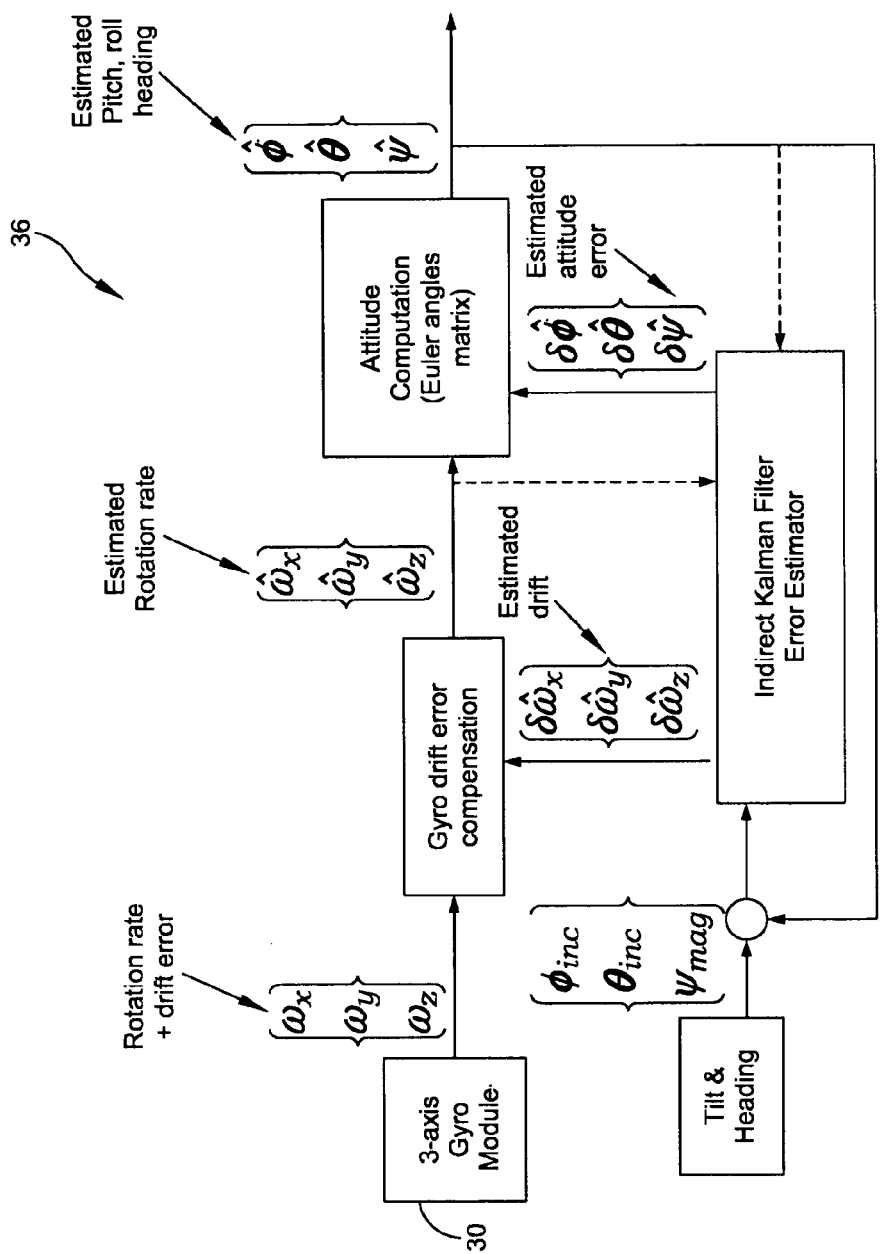
FIG. 4 is a data flow diagram for the Kalman filter implementation software module.

A software module and data flow diagram of the software implementation of the customized Kalman filter formulation is illustrated in FIG. 3. The notations are as follows: $\phi$, $\theta$, $\psi$ roll, pitch and heading respectively. The software implementation has four main software modules as follows: three-axis gyroscope module 30; three-axis accelerometer module 32; three-axis magnetometer module 34; and the Kalman filter implementation module 36 (implemented at some rate such as 20 Hz). As illustrated in FIG. 3, Gx, Gy and Gz are the gyroscope 16 outputs in radians per second, Temp is the temperature sensor output in degrees Celsius. Hx, Hy, and Hz are the magnetic field components read by the three axis magnetometer module 34 in gauss, $a_x$, $a_y$, and $a_z$ are the accelerometer 14 output in meters per second squared, $\omega_x$, $\omega_y$, $\omega_z$ are the corrected rotation rate in radians/second, $\psi_{mag}$ is the corrected magnetometer heading in radians, $æ_{inc}$ and $\theta_{inc}$ are the corrected sensor indication for pitch and roll in radians. $X_h$, $Y_h$ and $Z_h$ are the normalized, corrected magnetic field values after compass calibration in gauss. The symbols $\hat{\phi}$, $\hat{\theta}$ and $\hat{\psi}$ are the estimated pitch, roll and heading representing the final data output of the Kalman filter formulation.

Each of the accelerometers 14, gyroscopes 16, and magnetometers 12 has a calibration coefficient versus temperature table stored in non-volatile memory of processor 22. Calibration is done at temperature values of 0, 10, 20, 30, and 40 degrees Celsius. The operating temperature is from minus 2 to 40 degrees Celsius. Temperature, compensation is interpolated linearly between temperature points in the calibration table. The interpolation equation for accelerometer outputs is as follows:

$$a_x|_T = a_x|_{TL} + \frac{a_x|_{TH} - a_x|_{TL}}{TH - TL} \times (T - TL) \quad (6)$$

Where TL and TH are the high and low temperature interval values, $a_x|_{TH}$ and $a_x|_{TL}$ are the high and low values of acceleration bias from calibration. T is the current temperature of the temperature sensors 18. Temperature correction for the gyroscope and magnetometer sensors is performed in a like manner.

The three-axis accelerometer module 32 performs the following data processing steps. First the module smoothes the acceleration data. Due to accelerometer 14 random noise, a smoothing function is implemented by collecting samples of the acceleration at higher rate, for example at 100 Hz, averaging these samples and sending the output to the Kalman filter at a reduced rate, for example 20 Hz. The accelerometer 14 output is in voltage ($AV_x$). The accelerometer 14 offset is calibrated and stored in a lookup table versus temperature. Next the accelerometer module 32 uses the calibration table of the accelerometer versus temperature. The acceleration at output is calculated as follows according to equation (1):

$$a_x = \frac{AV_x - Abias_x}{scalefactor_x} \quad (1)$$

Where, $AV_x$ is the accelerometer voltage in the X direction, $Abias_x$ is the accelerometer bias versus temperature table for Accelerometer X. Y, and Z directions are treated similarly. The accelerometer output should be in units of G (acceleration of gravity).

In the next step, the output of the accelerometer from equation 1 is corrected for cross-axis effects as follows:

$$\begin{Bmatrix} a_x^c \\ a_y^c \\ a_z^c \end{Bmatrix} = \begin{bmatrix} d_{11} & d_{12} & d_{13} \\ d_{21} & d_{22} & d_{23} \\ d_{31} & d_{32} & d_{33} \end{bmatrix} \times \begin{Bmatrix} a_x \\ a_y \\ a_z \end{Bmatrix} \quad (7)$$

where $a_x$, $a_y$, $a_z$ are incoming accelerometer output after temperature correction, $a^c_x$, $a^c_y$, $a^c_z$ are the corrected acceleration output, the matrix vanes $d_{11}$, $d_{22}$, $d_{33}$ are equal to 1.0 if there is no calibration done (and under perfect conditions) and normally will be close 1.0. The additional off diagonal terms that represent the cross axis effect are zero (as default) or close to zero.

In the next step, tilt calculations are performed according to the following equations:

$$\theta = \tan^{-1}\left(\frac{a_x^c}{\sqrt{(a_y^2) + (a_z^2)}}\right) \quad (8)$$

$$\phi = \tan^{-1}\left(\frac{a_y^c}{\sqrt{(a_x^2) + (a_z^2)}}\right) \quad (9)$$

Note that the arctangent function must be able to distinguish which quadrant the sensor is pointing in. The specification for the roll is 0-360 degrees.

The next step is to calculate the total acceleration as follows (similar to equation (2) above):

$$a\_total = \sqrt{a_x^2 + a_y^2 + a_z^2} \quad (10)$$

If a_total is less than 0.90 (G) or a_total is greater than 1.1 (G), then a flag should be initialized MOVING=TRUE. The accelerometer module 32 outputs a value for pitch, roll, total acceleration and flag status (i.e., moving or stationary).

The three axis gyroscope module 30 performs the following data processing steps. First the module 30, using the calibration table of the gyroscope 16 versus temperature, calculates the rate of turn according to the following equation:

$$\omega_x = \frac{GV_x - Gbias_x}{scalefactor_x} \quad (3)$$

$Gbias_x$ is the gyroscope bias in the X direction versus temperature. The rate of turn in the Y and Z are calculated similarly.

The output of the gyroscopes 16 are corrected for cross-axis effects as follows:

$$\begin{Bmatrix} \omega_x^c \\ \omega_y^c \\ \omega_z^c \end{Bmatrix} = \begin{bmatrix} g_{11} & g_{12} & g_{13} \\ g_{21} & g_{22} & g_{23} \\ g_{31} & g_{32} & g_{33} \end{bmatrix} \times \begin{Bmatrix} \omega_x \\ \omega_y \\ \omega_z \end{Bmatrix} \quad (11)$$

where $\omega_x$, $\omega_y$, $\omega_z$ are incoming accelerometer 14 output after temperature correction, $\omega_x^c$, $\omega_y^c$, $\omega_z^c$ are the corrected acceleration output, the matrix values $g_{11}$, $g_{22}$, $g_{33}$, are equal to 1.0 as default and will be close 1.0. The off-diagonal terms which represent the cross-axis effect are zero (as default) or close to zero. The output generated by the three-axis gyroscope software module is $\omega_x$, $\omega_y$, $\omega_z$.

The three axis magnetometer module 34 performs the following data processing steps. First the module calibrates the magnetometer 12 versus temperature. In the next step, the field measurement of the magnetometer 12 is calculated as follows:

$$H_x = HV_x - Hbias_x \quad (4)$$

The next step is hard and soft iron calibration. The calibration results in a 3×3 matrix and additional constants. The equation for calibration is as follows:

$$\begin{Bmatrix} H_x^c \\ H_y^c \\ H_z^c \end{Bmatrix} = \begin{bmatrix} a & b & c \\ d & e & f \\ g & h & i \end{bmatrix} \times \begin{Bmatrix} H_x - H_{x0} \\ H_y - H_{y0} \\ H_z - H_{z0} \end{Bmatrix} \quad (12)$$

where a, b, c, d, e, f, g, h, i, $H_{x0}$, $H_{y0}$, $H_{z0}$ are parameters that have to be identified from calibration. The next step is calculating the heading. This is done by calculating the horizontal field components $X_h$ and $Y_h$, using the pitch and roll angles $\hat{\theta}$ and $\hat{\phi}$. The heading calculation is done as follows:

$$X_h = H_x^c \cos\hat{\theta} - H_y^c \sin\hat{\theta}\sin\hat{\phi} H_z^c \cos\hat{\phi}\sin\hat{\theta} \quad (13)$$

$$Y_h = H_y^c \cos\hat{\phi} + H_z^c \sin\hat{\phi} \quad (14)$$

The final heading is calculated according to $$\psi = \tan^{-1}(Y_h/X_h) \quad (15)$$

The Kalman Filter implementation module 36 combines the data from the accelerometers 14, gyroscopes 16 and magnetometers 12 and then estimates the variables that are not directly measurable, with the added advantage of smoothing the noise. In this case, gyroscopes 16 measure the orientation by integrating their angular rates. As a result, they provide a vibration insensitive orientation measurement with large attenuation for noise. Because the gyroscopes 16 have inherent drift in their measurements, they need to be corrected over time. Magnetometers 12 and accelerometers 14 provide a different measurement of the orientation that is drift free but they are noisy, and have problems with vibration. The Kalman Filter implementation module 36 weights the two sources of orientation information using a process model of the integrated gyroscope 16 input as shown in the following equation:

$$\begin{Bmatrix} \dot{\phi}(t) \\ \dot{\theta}(t) \\ \dot{\Psi}(t) \end{Bmatrix} = \begin{bmatrix} 1 & \sin\phi\tan\phi & \cos\phi\tan\theta \\ 0 & \cos\phi & -\sin\Psi \\ 0 & \sin\phi/\cos\theta & \cos\phi/\cos\theta \end{bmatrix} \begin{Bmatrix} \omega_x(t) \\ \omega_y(t) \\ \omega_z(t) \end{Bmatrix} \quad (5)$$

Where $\omega_x$, $\omega_y$, $\omega_z$ are the rates measured by the gyroscopes (including the gyroscopic drift). The output is called Euler angle rates. Now, the measurements from the remaining accelerometers 14 and magnetometers 12 $\{\phi_{inc}, \theta_{inc}, \Psi_{mag}\}$ are used to correct for the drift of the gyroscopes 16 and are blended with Euler angles integrated rate to yield the heading data.

The data flow diagram of the Kalman filter implementation module 36 is shown in FIG. 3. Note that $x=\{\hat{\phi} \; \hat{\theta} \; \hat{\psi}\}^T$ is the estimated orientation in the following order (roll, pitch and heading) in radians. $dx=\{\delta\hat{\phi} \; \delta\hat{\theta} \; \delta\hat{\psi}\}$ is the orientation error estimate vector in radians, omega=$\{\omega_x \; \omega_y \; \omega_z\}$ is the rate of turn coming in from the gyros including the gyro drift in radians/second, and domega=$\{\delta\hat{\omega}_x \; \delta\hat{\omega}_y \; \delta\hat{\omega}_z\}$ is the gyro drift estimate (also called bias drift) in radians/second.

The advantage of the present invention over the prior art is that it resolves performance limitations in prior art heading sensors. The key to the heading sensor 10 of the present invention is the ability to rely on the gyroscopes 16 during maneuvers to correct magnetometer 12 and accelerometer 14 errors particularly during turns when heading readings are normally unreliable and then to use the magnetometer 12 and accelerometer 14 during linear array motion to correct for the gyroscopic drift. In this manner the measured heading is much less sensitive to vibration and will maintain accuracy under array dynamic motion.

The present invention is the first embodiment of a towed array heading sensor 10 employing rate gyroscopes and an indirect Kalman filter function to improve performance.

In light of the above, it is therefore understood that within the scope of the appended claims, the invention may be practiced otherwise than as specifically described.

What is claimed is:

1. A heading sensor for use with an underwater towed array, comprising:
   at least three accelerometers, each capable of generating a voltage signal representing a measurement of acceleration, wherein each individual accelerometer is dedicated to measuring acceleration in one of the three spatial axes;
   at least three gyroscopes capable of generating a voltage signal representing a measurement of rotation, wherein each individual gyroscope is dedicated to measuring rotation in one of the three spatial axes;
   at least three magnetometers capable of generating a voltage signal representing a measurement of magnetic field, wherein each individual magnetometer is dedicated to measuring magnetic field in one of the three spatial axes;
   a temperature sensor capable of generating a voltage signal representing a measurement of temperature, wherein the accelerometers, magnetometers, gyroscopes and thermometer are solid state micro electro-mechanical systems components;
   an analog to digital converter and serial peripheral interface bus electrically joined to said accelerometers, gyroscopes, magnetometers, and temperature sensor, wherein said analog to digital converter will receive and digitize the voltage signals generated by the accelerometers, gyroscopes, magnetometers and temperature sensor and output the digitized signals through the serial peripheral interface bus;
   a micro controller electrically joined to said analog to digital converter through said serial peripheral interface bus, said micro controller receiving the digitized signals from said accelerometers, gyroscopes, magnetometers and temperature sensor and converting the digitized signals into heading, pitch and roll data;
   a serial binary output interface electrically joined to said micro controller as a means to output the heading, pitch and roll data; and
   wherein the individual accelerometers, magnetometers, gyroscopes, thermometer, analog to digital converter and serial peripheral interface, and micro controller are all mounted to a printed circuit board with a stabilized backing wherein said printed circuit board is contained in a non-ferrous cylindrical container that protects the components from hydrostatic pressure and mechanical forces, wherein said non-ferrous cylindrical container is capable of fitting within a diameter of 1.5 inches.

2. The heading sensor of claim 1 wherein the micro controller has a non-volatile memory component that stores a table of calibration coefficients versus temperature for each of the accelerometers, magnetometers and gyroscopes.

3. The heading sensor of claim 1 wherein the micro controller implements a customized Kalman filter formulation consisting of four software modules including a gyroscope module, a magnetometer module, an accelerometer module and a Kalman filter implementation module that converts the digitized signals to heading, pitch and roll data.

4. The heading sensor of claim 3 wherein the customized Kalman filter formulation comprises the steps of:
   calibrating the digitized accelerometer voltage output;
   calculating acceleration using the calibrated digitized accelerometer voltage output according to the formula $$a_{x,y,z} = \frac{AV_{x,y,z} - Abias_{x,y,z}}{scalefactor_{x,y,z}}$$

and $$A\text{total}=\sqrt{A_x^2+A_y^2+A_z^2};$$

calibrating the digitized gyroscope output voltage;
calculating the rate of turn using the calibrated digitized gyroscope output voltage according to the formula $$\omega_x = \frac{GV_x - Gbias_x}{scalefactor_x};$$

calibrating the digitized magnetometer signals;
calculating the field measurements of the magnetometer using the calibrated digitized magnetometer signals according to the formula $$H_x = HV_x - H\text{bias}_x;$$

processing a Kalman filter process, which integrates the following attitude equation:

$$\begin{Bmatrix} \dot{\phi}(t) \\ \dot{\theta}(t) \\ \dot{\Psi}(t) \end{Bmatrix} = \begin{bmatrix} 1 & \sin\phi\tan\phi & \cos\phi\tan\theta \\ 0 & \cos\phi & -\sin\Psi \\ 0 & \sin\phi/\cos\theta & \cos\phi/\cos\theta \end{bmatrix} \begin{Bmatrix} \omega_x(t) \\ \omega_y(t) \\ \omega_z(t) \end{Bmatrix}.$$

* * * * *